US006998362B2

(12) United States Patent
Higby et al.

(10) Patent No.: US 6,998,362 B2
(45) Date of Patent: Feb. 14, 2006

(54) GLASS COMPOSITIONS

(75) Inventors: Paige L. Higby, Maumee, OH (US);
Bret E. Penrod, Toledo, OH (US);
Rodney G. Baker, Maumee, OH (US);
Kenneth Melvin Fyles, Wigan (GB);
Helen Louise McPhail, Nr Wigan (GB)

(73) Assignees: Pilkington PLC, St. Helens (GB);
Pilkington North America, Inc.,
Toledo, OH (US)

( * ) Notice: Subject to any disclaimer, the term of this patent is extended or adjusted under 35 U.S.C. 154(b) by 1199 days.

(21) Appl. No.: 09/942,763

(22) Filed: Aug. 31, 2001

(65) Prior Publication Data

US 2002/0025899 A1    Feb. 28, 2002

Related U.S. Application Data

(63) Continuation of application No. 08/472,189, filed on Jun. 7, 1995, now abandoned, which is a continuation of application No. 08/285,652, filed on Aug. 3, 1994, now Pat. No. 5,478,783, which is a continuation-in-part of application No. 08/190,883, filed on Feb. 3, 1994, now abandoned.

(30) Foreign Application Priority Data

Feb. 4, 1993    (GB)    ................................ 9302186

(51) Int. Cl.
*C03C 3/087*    (2006.01)
(52) U.S. Cl. ........................................................ 501/71
(58) Field of Classification Search .................. 501/70, 501/71
See application file for complete search history.

(56) References Cited

U.S. PATENT DOCUMENTS 6,114,264 A    9/2000    Krumwiede et al. .......... 501/70

FOREIGN PATENT DOCUMENTS

EP    0653386    *    5/1995

* cited by examiner

*Primary Examiner*—Karl Group
(74) *Attorney, Agent, or Firm*—Marshall & Melhorn, LLC

(57) ABSTRACT

An infrared and ultraviolet absorbing soda-lime-silica glass of a neutral tint containing 0.3% to 0.7% by weight total iron expressed as $Fe_2O_3$, together with amounts of Se, $Co_3O_4$ and a ferrous iron content to provide a ratio of ferrous iron to total iron in the range of 21 to 34. NiO and $TiO_2$ may be added to the glass. The resultant glass, in a nominal 4 mm thickness, has a visible light transmission of at least 70% and a direct solar heat transmission at least 12 percentage points below the visible light transmission. The iron in the glass is preferably provided by the inclusion of the mineral wuestite in the glass batch formulation.

45 Claims, No Drawings

GLASS COMPOSITIONS

RELATED APPLICATION

This application is a continuation of application Ser. No. 08/472,189, filed Jun. 7, 1995, now abandoned, which is a continuation of application Ser. No. 08/285,652, filed Aug. 3, 1994, now U.S. Pat. No. 5,478,783, which is a continuation-in-part of U.S. application Ser. No. 08/190,883, filed Feb. 3, 1994, now abandoned.

BACKGROUND OF THE INVENTION

The present invention relates to infrared (IR) and ultraviolet (UV) absorbing soda-lime-silica glass compositions for use in glazing. More particularly, the present invention relates to windows of a neutral tint made from such glasses primarily, but not exclusively, for vehicles such as automobiles.

Special glasses have been developed for use in vehicles which have low levels of direct solar heat transmission (DSHT) and ultraviolet transmission (UVT). These glasses aim to reduce the problems caused by excessive heating within the vehicle on sunny days, and to protect the interior furnishings of the car from the degradation caused by ultraviolet radiation. Glasses having good infrared absorption properties are usually produced by reducing iron present in the glass to the ferrous state or by adding copper. Such materials give glasses a blue color. The materials added to achieve good ultraviolet radiation absorption are $Fe^{3+}$, Ce, Ti or V. The quantities of such materials which are added to provide the desired level of absorption tend to color the glass yellow. Accordingly, if both good UV and good IR absorption are required in the same glass, the color of such glass is, almost inevitably, either green or blue. When the color of the glasses is defined by the CIELAB system, such commercial glasses, in 4 mm thickness and having greater than 60% light transmission, are found to be either very green ($-a^*>8$) or very blue ($-b^*>7$), neither of which are currently desirable from an aesthetic viewpoint.

Attempts have been made to produce grey or bronze-colored vehicle glazing having good protection against both IR and UV radiation, but such glasses still tend to have a greenish yellow tinge.

We have identified a requirement for a range of glasses having a neutral tint and a visible light transmittance (Illuminant A) of at least 70 percent such that, in the CIELAB system, the glasses have color co-ordinates lying in the ranges $a^*$ from $-7$ to $+1$, $b^*$ from $-5$ to $+7.5$. The term "neutral tint" is hereinafter used to describe glasses having such color co-ordinates.

We have further identified a requirement for glasses having a neutral tint which have visible light transmissions of at least 70 percent (at a thickness of 4 mm), but which also have a direct solar heat transmission which is at least twelve percentage points (preferably fifteen percentage points and most preferably twenty percentage points) less than the visible light transmission. Basically, glasses are known which do have a low direct solar heat transmission but nearly all of these have a low visible light transmission which tend to make such glasses of limited use in vehicles. Glasses satisfying the above-identified requirements should, we anticipated, be of more general use in vehicles due to the higher light transmission but the lower direct solar heat transmission should keep the interior of the car cool despite the higher light transmission.

Furthermore, we believed that it would be desirable if the glasses had an ultraviolet transmission less than 55% and ideally less than 50% because we felt that such a low transmission would minimize the adverse effects of ultraviolet radiation on plastics material and fabrics, particularly in automotive vehicles.

The field of tinted glasses is one in which relatively small changes can produce major changes in tint. Wide ranges disclosed in prior patents can encompass many possibilities, and it is only the teaching of the specific examples that can be relied on as identifying how particular tints associates with particular ranges of absorption of infrared and ultraviolet radiation can be obtained.

Our invention is based on the surprising discovery that the incorporation of relatively small amounts of certain coloring agents compensates for the green color arising from the presence of infrared and ultraviolet radiation absorbing components.

SUMMARY OF THE INVENTION

According to the present invention, there is provided an IR and UV absorbing soda lime silica glass of a neutral tint (as herein defined) having, in a 4 mm thickness, a visible light transmission of at least 70%, a direct solar heat transmission at least 12 percentage points below the visible light transmission, a UV transmission not greater than 55%, a dominant wavelength less than 560 nm and a color purity not greater than 6, preferably not more than 5 and most preferably no more than 3. Most, preferably the direct solar heat transmission is at least 20 percentage points lower than the visible light transmission. The composition comprises a soda-lime-silica base glass and a total iron content, expressed as $Fe_2O_3$, in the range of from 0.3 to 0.7% by weight. The glass is tinted to a neutral color by the inclusion of 0.5 to 10 parts by million (ppm) of Se, from about 3 to 25 ppm of $Co_3O_4$, and a ferrous iron content to provide a ratio of ferrous iron to total iron in the range of 21 to 34, preferably 25 to 31 (i.e., percent of total iron as ferrous iron ($Fe^{2+}$) of 21% to 34%, preferably 25% to 31% *). NiO and $TiO_2$ may be added to the glass, in ranges of 0 to 50 ppm NiO and 0 to 1.5 weight percent $TiO_2$. Thus, it has been determined that amounts of NiO and $TiO_2$, in the above ranges can produce beneficial affects on color purity and UV absorption, respectively, without deleteriously influencing the unique and highly advantageous properties of our novel glass.

*As is well known, the iron content in glasses is usually present in both the $Fe_2O_3$ (ferric) and FeO (ferrous) forms. As is conventional, the total amount of iron present in a glass is expressed herein as $Fe_2O_3$, regardless of the form actually present.

For the purpose of the present specification and claims, references to visible light transmission are to light transmission (LT) measured using CIE Illuminant A; UVT or ultraviolet radiation transmission is an integrated term representing the area under the transmission versus wavelength curve for wavelengths between 300 and 400 nm; and references to direct solar heat transmission (DSHT) are references to solar heat transmission integrated over the wavelength range 350 to 2100 nm according to the relative solar spectral distribution Parry Moon for air mass 2.

Suitable batch materials for producing glasses according to the present invention, which materials are compounded by conventional glass batch ingredient mixing devices, include sand, limestone, dolomite, soda ash, salt cake or gypsum, niter, iron oxide, carbon, selenium and cobalt oxide ($Co_3O_4$). In the event $TiO_2$ and/or NiO are desired in the composition, a titanium compound such as titanium dioxide and a nickel compound such as nickel oxide may be included in the batch. In this connection, and in accordance with an important embodiment of this invention it has surprisingly been discovered that the use of wuestite as the source of iron is particularly advantageous, supplying at least a partial amount or preferably all of the $Fe_2O_3$ and substantially eliminating the need for carbon. Thus, carbon is a very deleterious element in neutral tint glasses, e.g., grey and bronze glasses, but is required to raise the ferrous values of the glasses where employing rouge as the batch iron source. The use of wuestite as the iron source instead of rouge greatly increases the ferrous value of a glass. The use of a raw material with a higher natural ferrous value allows better control of higher ferrous values in glasses such as the neutral tint glasses of this invention.

The batch materials are conveniently melted together in a conventional glass making furnace, to form a neutral tinted infrared energy and ultraviolet radiation absorbing glass composition, which thereafter may be continuously cast onto the molten metal bath in a float glass process.

The composition of soda-lime-silica flat glasses suitable for use in accordance with the present invention typically have the following weight percentage constituents:

| | |
|---|---|
| $SiO_2$ | 65–80% |
| $Na_2O$ | 10–20 |
| CaO | 5–15 |
| MgO | 0–10 |
| $Al_2O_3$ | 0–5 |
| $K_2O$ | 0–5 |
| BaO | 0–5 |
| $B_2O_3$ | 0–5 |

Other minor ingredients, including melting and refining aids such as $SO_3$, may also appear in the glass composition. The coloring constituents of the present invention set forth above are added to this base glass. The glass is essentially free of colorants other than iron, cobalt, and selenium, and optionally nickel and titanium, other than any trace amounts of oxides that may be present as impurities. Accordingly, the glass of the present invention may be melted and refined in a conventional tank-type melting furnace and formed into flat glass sheets of varying thicknesses by the float method in which the molten glass is supported on a pool of molten metal, usually tin, as it assumes a ribbon shape and is cooled.

The glass compositions of the present invention are particularly suited for the production of infrared energy and ultraviolet radiation absorbing glass for automotive and architectural glazings. Thus, glass sheets of this composition may be heat strengthened or tempered, or alternately annealed and laminated together through an interposed transparent resinous layer, for example composed of polyvinyl butyral, and employed, for example, as a windshield. Generally, the glass sheets for windshield use are of a thickness in the range of from about 1.7 mm to about 2.5 mm, while those tempered and used as sidelights or backlights are in the range of about 3 mm to about 5 mm thick.

Unless otherwise noted, the term percent (%) as used herein and in the appended claims, means percent (%) by weight. Wavelength dispersive X-ray fluorescence was used to determine the weight percents of $TiO_2$ and total iron expressed as $Fe_2O_3$. Percent reduction of total iron was determined by first measuring the radiant transmission of a sample at a wavelength of 1060 nanometers, using a spectrophotometer. The 1060 nm transmission value was then used to calculate optical density, using the following formula:

$$\text{Optical density} = \text{Log}_{10} \frac{T_o}{T}$$

($T_o$ = 100 minus estimated loss from reflection = 92;

$T$ = transmission at 1060 nm).

The optical density was then used to calculate the percent reduction:

$$\text{percent reduction} = \frac{(110) \times (\text{optical density})}{(\text{Glass thickness in mm}) \times (\text{wt \% total Fe}_2\text{O}_3)}$$

DETAILED DESCRIPTION OF THE PREFERRED EMBODIMENT

The concentrations of each of the three essential colorant constituents depend upon the optical properties desired for the glass and are interrelated to each other. Iron is added, typically as $Fe_2O_3$, and is partially reduced to FeO. The total amount of iron in the batch is critical, and must equal from 0.3 percent to about 0.7 percent by weight, expressed as $Fe_2O_3$. Likewise, the degree of reduction is critical and must equal between 21% and 34%. If the iron is more highly reduced than the critical amount, or if a higher total amount of iron is employed, the glass will become too dark and the Illuminant A visible light transmittance will drop below about 70 percent. Additionally, the glass batch melting process will become increasingly difficult as the increased amount of FeO prevents the penetration of heat to the interior of the melt. If the iron is less reduced than the critical amount, or if a lower total amount of iron is employed, then the direct solar heat transmittance for a desired thickness glass can rise to an unacceptable level, i.e., above about 58%.

From about 3 to about 25 ppm cobalt oxide is added, typically as $Co_3O_4$, along with about 0.5 to about 10 ppm selenium. The proper selenium and cobalt content provides an aesthetically pleasing, neutral tint, somewhat gray color to the glass. Preferred compositions, include a soda-lime-silica base glass and colorants consisting essentially of 0.45 to 0.65 total iron (as $Fe_2O_3$), with a ratio of ferrous iron to total iron of 25 to 31, 1 to 5 ppm Se, 8 to 20 ppm $Co_3O_4$, 0 to 35 ppm NiO and 0 to 1 weight percent $TiO_2$.

The following examples illustrate glass compositions in accordance with the invention that are readily formed into glass articles or glazings such as automobile windshields. The compositions absorb both infrared and ultraviolet rays and have an Illuminant A visible light transmission of at least about 70% and a direct solar heat transmission at least 12 percentage points less than the visible light transmission.

The examples, except examples 1 and 11 which are for comparison purposes only, illustrate but do not limit the invention. In the examples, all parts and percentages are by weight and:
(a) $Fe_2O_3$, FeO, and $TiO_2$ are expressed in percent; Se, $Co_3O_4$ and NiO are expressed in parts per million;
(b) total iron is expressed as if all iron present were present as ferric oxide; and
(c) the FeO content is calculated from the equation $$\% \text{FeO} = \frac{\% \text{Fe}^{2+}}{100} \times \text{Fe}_2\text{O}_3 \times \frac{143.7}{159.7}$$

$Fe_2O_3$=percentage total iron, expressed as $Fe_2O_3$, in the glass (143.7 being the molecular weight of 2×FeO and 159.7 being the molecular weight of $Fe_2O_3$).

The transmittance data in the Table below and throughout are based on a nominal glass thickness of 4 mm.

oxide that migrated into surface portions of the glass on at least one side. Typically a piece of float-forming glass has an $SnO_2$ concentration of at least 0.05% by weight in the first few microns below the surface that was in contact with the tin. Glass made by the float process typically ranges from about 2 millimeters to 10 millimeters in thickness.

Another characteristic of most float glass is the presence of traces of melting and refining aids such as sulfur, analyzed in the glass as $SO_3$, or fluorine or chlorine. Small amounts of these melting and refining aids (usually less than 0.3% by

TABLE I

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Total Iron as $Fe_2O_3$ | 0.5 | 0.55 | 0.55 | 0.31 | 0.61 | 0.56 | 0.56 | 0.54 | 0.57 | 0.51 | 0.53 |
| FeO | 0.11 | 0.14 | 0.13 | 0.08 | 0.14 | 0.13 | 0.14 | 0.13 | 0.16 | 0.12 | 0.09 |
| % of Total Iron as $Fe^{2*}$ | 25 | 29 | 27 | 27.2 | 26 | 25 | 27 | 27 | 31 | 27 | 19 |
| Se | 2 | 7 | 9 | 3 | 2 | 2 | 1 | 1 | <1 | 2 | 5 |
| $Co_3O_4$ | 10 | 10 | 19 | 20 | 12 | 5 | 13 | 24 | 10 | 32 | 13 |
| $TiO_2$ | 1.6 | 0.33 | 0.34 | — | — | — | — | — | — | 1.0 | — |
| NiO | — | — | 15 | — | — | 23 | — | 31 | — | — | — |
| LT | 72 | 71 | 71 | 75 | 73 | 76 | 74 | 72 | 74 | 71 | 71 |
| DSHT | 53 | 50 | 51 | 63 | 51 | 54 | 52 | 53 | 50 | 52 | 57 |
| UTV | 36 | 45 | 47 | 59 | 51 | 51 | 51 | 53 | 53 | 40 | 46 |
| a* | −5.1 | −4.8 | −5.2 | −2.0 | −4.7 | −4.9 | −5.3 | −5.0 | −6.2 | −5.2 | −1.9 |
| b* | 7.5 | 3.2 | 2.4 | 0.2 | 1.5 | 1.9 | 0.3 | −1.0 | −0.8 | 5.5 | 4.1 |
| \D | 565 | 546 | 529 | 499 | 512 | 518 | 498 | 499 | 494 | 560 | 569 |
| Purity | 6.9 | 2.4 | 1.7 | 0.8 | 1.3 | 1.3 | 2.3 | 3.3 | 3.6 | 4.8 | 4.0 |

The base glass composition for example 7, which is essentially the same for all of the examples, was as follows:

| Component | Weight Percent of Total Glass |
|---|---|
| $SiO_2$ | 73.91 |
| $Na_2O$ | 14.04 |
| CaO | 7.86 |
| MgO | 3.47 |
| $SO_3$ | 0.20 |
| $Al_2O_3$ | 0.16 |
| $K_2O$ | 0.039 |

The batch mixture for example 7, which is likewise similar for all of the examples except for the colorants, was:

| Constituent | Parts by Weight |
|---|---|
| Sand | 154 |
| Soda Ash | 50 |
| Gypsum | 1 |
| Limestone | 11 |
| Dolomite | 33 |
| Wuestite | 1.02 |
| $C_3O_3$ | 0.0011 |
| Selenium | 0.0014 |
| Carbon | 0.027 |

It is an advantage of the present invention that the composition can be manufactured into flat glass products using commercial manufacturing processes, in particular the float process. A sheet of glass that has been formed by the float process is characterized by measurable amounts of tin weight) may be present in the glass compositions of the present invention without effect on the properties.

This description of the invention has been made with reference to specific examples, but it should be understood that variations and modifications as are known to those of skill in the art may be resorted to without departing from the scope of the invention as defined by the claims that follow.

What is claimed is:

1. A neutral gray colored glass composition having a base glass portion comprising:

| $SiO_2$ | 65 to 80 percent by weight |
|---|---|
| $Na_2O$ | 10 to 20 percent by weight |
| CaO | 5 to 15 percent by weight |
| MgO | 0 to 10 percent by weight |
| $Al_2O_3$ | 0 to 5 percent by weight |
| $K_2O$ | 0 to 5 percent by weight | and a colorant portion consisting essentially of:

| $Fe_2O_3$ (total iron) | 0.30 to 0.70 percent by weight |
|---|---|
| FeO | 0.08 to 0.16 percent by weight |
| $Co_3O_4$ | 3 to 25 PPM |
| Se | 0.5 to 10 PPM | wherein the color of the glass is characterized by a dominant wavelength less than 560 nanometers, a color purity of no higher than 6 percent and a visible light transmission of 70 percent or greater at a thickness of 4 millimeters, and wherein the percent reduction of the total iron is between 21% and 34%.

2. The composition as in claim 1 wherein the direct solar heat transmission is at least 12 percentage points below the visible light transmission.

3. The composition as in claim 2 wherein the $Fe_2O_3$ concentration is from 0.45 to 0.65 weight percent, the $Co_3O_4$ concentration is from 8 to 7 PPM and the Se concentration is from 1 to 5 PPM.

4. The composition of claim 1 wherein the color of the glass is characterized by
a dominant wavelength in the range of 494 to 560 nanometers and a color purity of no higher than 3%.

5. The composition as in claim 1 further including titanium dioxide present in an amount up to 1.5 wt. % of the glass composition.

6. The composition as in claim 5 wherein said $TiO_2$ is present in an amount from 0.33 to 1.0 wt. %.

7. A glass sheet made from the composition as recited in claim 1.

8. The glass sheet as in claim 7 wherein the sheet has a thickness between 1.7 to 5 mm.

9. The glass sheet as in claim 7 wherein the color of the glass is characterized by a dominant wavelength in the range of 494 to 560 nanometers and a color purity of no higher than 3%.

10. A neutral gray colored glass composition having a base glass portion comprising:

| | |
|---|---|
| $SiO_2$ | 65 to 80 percent by weight |
| $Na_2O$ | 10 to 20 percent by weight |
| CaO | 5 to 15 percent by weight |
| MgO | 0 to 10 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.30 to 0.70 percent by weight |
| FeO | 0.08 to 0.16 by weight |
| $Co_3O_4$ | 3 to 25 PPM |
| Se | 0.5 to 10 PPM |
| NiO | up to 50 PPM | wherein the color of the glass is characterized by a dominant wavelength in the range of less than 560 nanometers, a color purity of no higher than 6 percent and a visible light transmission of 70 percent or greater at a thickness of 4 millimeters, and wherein the percent reduction of the total iron is between 21% and 34%.

11. The composition as in claim 8 wherein the direct solar heat transmission is at least 12 percentage points below the visible light transmission.

12. The composition as in claim 10 wherein the $Fe_2O_3$ concentration is from 0.45 to 0.65 weight percent, the $Co_3O_4$ concentration is from 8 to 20 PPM, and the Se concentration is from 1 to 5 PPM.

13. The composition of claim 11 wherein the color of the glass is characterized by A dominant wavelength in the range of 494 to 560 nanometers and a color purity of no higher than 3%.

14. The composition as in claim 10 further including additional ultraviolet absorbing material.

15. The composition as in claim 14 wherein said ultraviolet absorbing material is titanium dioxide present in an amount up to 1.5 wt. % of the glass composition.

16. The composition as in claim 15 wherein said $TiO_2$ is present in an amount from 0.33 to 1.0 wt. %.

17. A glass sheet made from the composition as recited in claim 10.

18. The glass sheet as in claim 17 wherein the sheet has a thickness between 1.7 to 5 mm.

19. The glass sheet as in claim 17 wherein the color of the glass is characterized by a dominant wavelength in the range of 494 to 560 nanometers and a color purity of no higher than 3%.

20. A neutral gray colored glass composition having a base glass portion comprising:

| | |
|---|---|
| $SiO_2$ | 65 to 80 percent by weight |
| $Na_2O$ | 10 to 20 percent by weight |
| CaO | 5 to 15 percent by weight |
| MgO | 0 to 10 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.45 to 0.70 percent by weight |
| FeO | 0.08 to 0.16 percent by weight |
| $Co_3O_4$ | 3 to 25 PPM |
| Se | 0.5 to 10 PPM | wherein the color of the glass is characterized by a dominant wavelength less than 560 nanometers, a color purity of no higher than about 8 percent, a visible light transmission of greater than 70 percent, and a direct solar heat transmission at least 12 percentage points below the visible light transmission at a thickness of 4 millimeters, and wherein the percent reduction of the total iron is between 21% and 34%.

21. The composition of claim 20 wherein the color of the glass is characterized by a dominant wavelength in the range of 494 to 560 nanometers and a color purity of no higher than 3% at a thickness of 4 millimeters.

22. The composition as in claim 20 further including additional ultraviolet absorbing material.

23. A glass sheet made from the composition as recited in claim 20.

24. A neutral gray colored glass composition having a base glass portion comprising:

| | |
|---|---|
| $SiO_2$ | 65 to 80 percent by weight |
| $Na_2O$ | 10 to 20 percent by weight |
| CaO | 5 to 15 percent by weight |
| MgO | 0 to 10 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | 0.45 to 0.70 percent by weight |
| FeO | 0.08 to 0.16 percent by weight |
| $Co_3O_4$ | 3 to 25 PPM |
| Se | 0.5 to 10 PPM | wherein the color of the glass is characterized by a dominant wavelength less than 560 nanometers, a color purity of no higher than 6 percent and a visible light transmission of greater than 70 percent at a thickness of 4 millimeters, and wherein the percent reduction of the total iron is between 21% and 34%.

25. The composition as in claim 24 wherein the color of the glass is characterized by a dominant wavelength in the range of 494 to 560 nanometers and a color purity of no higher than 3 percent at a thickness of 4 millimeters.

26. A neutral gray colored glass composition having a base glass portion comprising:

| | |
|---|---|
| $SiO_2$ | 65 to 80 percent by weight |
| $Na_2O$ | 10 to 20 percent by weight |
| CaO | 5 to 15 percent by weight |
| MgO | 0 to 10 percent by weight |
| $Al_2O_3$ | 0 to 5 percent by weight |
| $K_2O$ | 0 to 5 percent by weight | and a colorant portion consisting essentially of:

| | |
|---|---|
| $Fe_2O_3$ (total iron) | greater than 0.45 up to 0.65 percent by weight |
| FeO | 0.08 to 0.16 percent by weight |
| $Co_3O_4$ | 3 to 25 PPM |
| Se | 0.5 to 10 PPM |
| NiO | up to 50 PPM | wherein the glass has a visible light transmission luminous transmittance of greater than 70 percent at a thickness of 4.0 millimeters, and wherein the percent reduction of the total iron is between 21% and 34%.

27. The composition as in claim 26 wherein the color of the glass is characterized by a dominant wavelength in the range of 494 to 560 nanometers and a color purity of no higher than 6 percent at a thickness of 4.0 millimeters.

28. The composition of claim 26 wherein the color of the glass is characterized by a dominant wavelength in the range of 494 to 560 nanometers and a color purity of no higher than 3% at a thickness of 4.0 millimeters.

29. The composition as in claim 26 wherein the $Fe_2O_3$ concentration is from 0.51 to 0.61 weight percent.

30. The composition as in claim 26 wherein the direct solar heat transmission is at least 12 percentage points below the visible light transmission.

31. The composition as in claim 26 further including additional ultraviolet absorbing material.

32. A glass sheet made from the composition as recited in claim 26.

33. The composition as in claim 26 wherein the $Fe_2O_3$ concentration is from 0.51 to 0.61 weight percent, the FeO concentration is from 0.08 to 0.14 weight percent, the $Co_3O_4$ concentration is from 5 to 24 PPM, the Se concentration is from 1 to 9 PPM and the NiO concentration is 15 to 31 PPM and further wherein said composition has a visible light transmission of 70 percent or greater at a thickness of 4 millimeters.

34. The composition as in claim 20 wherein the $Fe_2O_3$ concentration is from 0.51 to 0.61 weight percent, the FeO concentration is from 0.08 to 0.14 weight percent, the $Co_3O_4$ concentration is from 5 to 24 PPM and the Se concentration is from 1 to 9 PPM.

35. An IR and UV absorbing soda-lime-silica glass of a neutral tint having, in a nominal 4 mm thickness, a visible light transmission of at least 70%, a direct solar heat transmission at least twelve percentage points below the visible light transmittance, a dominant wavelength not greater than 560 nm and a color purity of no more than 6%, said glass on a weight basis including as essential ingredients a total iron content expressed as $Fe_2O_3$ from about 0.3% to 0.7%, from about 0.5 to 10 ppm Se, from about 3 to 25 ppm $Co_3O_4$, 0 to 50 ppm NiO and 0 to 1.5% $TiO_2$, and having a ferrous iron to total iron (as $Fe_2O_3$) ratio in the range of 21 to 34.

36. An IR and UV absorbing soda-lime-silica glass as claimed in claim 35, wherein said direct solar heat transmission is at least fifteen percentage points below the visible light transmittance.

37. An IR and UV absorbing soda-lime-silica glass as claimed in claim 35, having an ultraviolet radiation transmission less than 55%.

38. An IR and UV absorbing soda-lime-silica glass as claimed in claim 37, wherein said ultraviolet radiation transmission is less than 50%.

39. An IR and UV absorbing soda-lime-silica glass of a neutral tint having, in a nominal 4 mm thickness, a visible light transmittance of at least 70%, a direct solar heat transmission at least fifteen percentage points below the visible light transmittance, a dominant 20 wavelength not greater than 560 nm and a color purity of no more than 6%, said glass on a weight basis including as essential ingredients a total iron content expressed as $Fe_2O_3$ from about 0.45% to 0.65%, from about 1 to 5 ppm Se, from about 8 to 20 ppm $Co_3O_4$, 0 to 35 ppm NiO and 0 to 1% $TiO_2$, and having a ferrous iron to total iron (as $Fe_2O_3$) ratrio in the range of 25 to 31.

40. An IR and UV absorbing soda-lime-silica glass as claimed in claim 39, wherein said direct solar heat transmission is at least 20 percent points below the visible light transmittance.

41. An IR and UV absorbing soda-lime-silica glass as claimed in claim 39, wherein said color purity is no more than 5%.

42. An IR and UV absorbing soda-lime-silica glass as claimed in claim 39, wherein said color purity is no more than 3%.

43. An IR and UV absorbing soda-lime-silica glass as claimed in claim 39, having an ultraviolet radiation transmission less than 55%.

44. An IR and UV absorbing soda-lime-silica glass as claimed in claim 43, wherein said ultraviolet radiation transmission is less than 50%.

45. An IR and UV absorbing soda-lime-silica glass of a neutral tint having a base glass composition comprising in percent by weight:

| | |
|---|---|
| $SiO_2$ | 65–80 |
| $Na_22O$ | 10–20 |
| CaO | 5–15 |
| MgO | 0–10 |
| $Al_2O_3$ | 0–5 |
| $K_2O$ | 0–15 |
| BaO | 0–5 |
| $B_2O_3$ | 0–5 | and traces of melting and refining ads, if any, and colorants consisting essentially of:

| | |
|---|---|
| $Fe_2O_3$ (total iron) | 0.3–0.7 weight percent; |
| Se | 0.5–10 ppm; |
| $Co_3O_4$ | 3–25 ppm; |
| $TiO_2$ | 0–1.5 weight percent; |
| NiO | 0–50 ppm; and |

-continued

| | |
|---|---|
| FeO | content to provide a ratio of ferrous iron to total iron in the range of 21 to 34, | the glass having a visible light transmittance of at least 70%, a direct solar heat transmission at least 12 percentage points below the visible light transmittance, a dominant wavelength not greater than 560 nm and a color purity of no more than 6% at a nominal glass thickness of 4 mm.

* * * * *